United States Patent
Mönnig et al.

(10) Patent No.: US 10,017,938 B2
(45) Date of Patent: Jul. 10, 2018

(54) CONCRETE ELEMENT COMPRISING A SOUND-ABSORBER

(71) Applicant: Construction Research & Technology, GmbH, Trostberg (DE)

(72) Inventors: Sven Mönnig, Remseck (DE); Sarunas Turcinskas, Trostberg (DE)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

(21) Appl. No.: 15/030,513

(22) PCT Filed: Oct. 27, 2014

(86) PCT No.: PCT/EP2014/072987
§ 371 (c)(1),
(2) Date: Apr. 19, 2016

(87) PCT Pub. No.: WO2015/063022
PCT Pub. Date: May 7, 2015

(65) Prior Publication Data
US 2016/0265216 A1 Sep. 15, 2016

(30) Foreign Application Priority Data
Oct. 31, 2013 (EP) ..................... 13191001

(51) Int. Cl.
*E04C 2/288* (2006.01)
*E04B 1/84* (2006.01)
(Continued)

(52) U.S. Cl.
CPC ............. *E04B 1/86* (2013.01); *E04C 2/288* (2013.01); *E04C 2/46* (2013.01); *E04C 2/50* (2013.01);
(Continued)

(58) Field of Classification Search
CPC . E04B 1/84; E04B 1/86; E04B 1/8227; E04B 2001/8423; E04B 2001/8438;
(Continued)

(56) References Cited

U.S. PATENT DOCUMENTS 2,007,130 A * 7/1935 Munroe .................... E04B 1/86
106/DIG. 3
2,592,634 A * 4/1952 Wilson ...................... E04B 1/04
52/125.5
(Continued)

FOREIGN PATENT DOCUMENTS

CA 2044168 A1 9/1990
CH 671054 A5 * 7/1989 ............ E01F 8/0029
(Continued)

OTHER PUBLICATIONS

Shi, et al., Alkali-Activated Cements and Concretes, 2006, Chapter 3, pp. 30-63.
(Continued)

*Primary Examiner* — Edgardo San Martin
(74) *Attorney, Agent, or Firm* — Curatolo Sidoti Co., LPA; Joseph G. Curatolo; Vincent A. Cortese

(57) ABSTRACT

The invention concerns a reinforced concrete element comprising an at least partially open-cell foamed, sound-absorbing material which is partially exposed on a surface of the concrete element. The surface on which the foamed material is exposed consists only partially of the foamed material and the reinforcement is partially surrounded by the foamed material. The invention further concerns a method of producing the concrete element and the use thereof as an acoustic ceiling in a building.

15 Claims, 2 Drawing Sheets

(51) Int. Cl.
*E04B 1/86* (2006.01)
*E04B 2/00* (2006.01)
*E04B 5/02* (2006.01)
*G10K 11/16* (2006.01)
*E04C 2/26* (2006.01)
*E04B 1/82* (2006.01)
*E04B 1/74* (2006.01)

(52) U.S. Cl.
CPC ........ *G10K 11/16* (2013.01); *E04B 2001/742* (2013.01); *E04B 2001/849* (2013.01); *E04B 2001/8414* (2013.01); *E04B 2001/8457* (2013.01); *E04B 2001/8476* (2013.01)

(58) Field of Classification Search
CPC ....... E04B 2001/8476; E04B 2001/848; E04B 2001/849; E04B 2001/742; E04B 5/16; E04B 5/18; E04B 5/23; E04C 2/288; E04C 2/50
See application file for complete search history.

(56) References Cited

U.S. PATENT DOCUMENTS

| | | | | |
|---|---|---|---|---|
| 3,217,375 A | * | 11/1965 | Kinnard | B28B 1/084 264/228 |
| 3,396,112 A | | 8/1968 | Burrows | |
| 3,433,322 A | * | 3/1969 | Olsson | E04B 1/86 181/285 |
| 3,444,956 A | | 5/1969 | Gaffney | |
| 3,938,922 A | * | 2/1976 | Godley | B28B 7/0032 249/131 |
| 3,943,676 A | * | 3/1976 | Ickes | E04C 2/044 52/309.11 |
| 4,094,380 A | * | 6/1978 | Kobayashi | E01F 8/0029 181/285 |
| 4,128,975 A | * | 12/1978 | Abate | B28B 1/084 52/125.4 |
| 4,195,713 A | * | 4/1980 | Hagbjer | B32B 7/02 181/208 |
| 4,272,230 A | | 6/1981 | Abate | |
| 4,558,850 A | * | 12/1985 | Melfi | E01F 8/0017 181/210 |
| 5,193,318 A | * | 3/1993 | D'Antonio | E04B 1/8404 181/285 |
| 5,244,726 A | | 9/1993 | Laney et al. | |
| 5,268,540 A | * | 12/1993 | Rex | E01F 8/0058 181/210 |
| 5,398,470 A | * | 3/1995 | Ritter | E04B 5/38 52/309.11 |
| 5,422,446 A | * | 6/1995 | Fries | G10K 11/172 181/293 |
| 5,930,965 A | * | 8/1999 | Carver | E04B 5/263 264/31 |
| 6,705,055 B2 | * | 3/2004 | Ritter | E04C 2/044 52/309.11 |
| 7,281,357 B2 | * | 10/2007 | Femminella | E04B 5/12 52/334 |
| 7,721,847 B2 | * | 5/2010 | Coury | E04B 9/001 181/293 |
| 7,784,235 B2 | * | 8/2010 | Cretti | E04B 5/19 52/309.12 |
| 7,913,812 B2 | * | 3/2011 | Sanders | E01F 8/0082 181/210 |
| 7,954,291 B2 | * | 6/2011 | Cretti | E04B 5/19 52/309.12 |
| 2002/0175023 A1 | * | 11/2002 | Wilson | E04B 1/86 181/293 |
| 2004/0065506 A1 | * | 4/2004 | Salls | E01F 8/0029 181/285 |
| 2008/0041004 A1 | * | 2/2008 | Gibbar | E04C 2/288 52/309.12 |
| 2009/0229493 A1 | | 9/2009 | Kim et al. | |
| 2010/0043674 A1 | | 2/2010 | Gaillard et al. | |
| 2014/0030479 A1 | | 1/2014 | Christandl et al. | |
| 2014/0047999 A1 | | 2/2014 | Razl | |
| 2014/0374952 A1 | * | 12/2014 | Bergiadis | E01F 8/0023 264/261 |

FOREIGN PATENT DOCUMENTS

| | | | | |
|---|---|---|---|---|
| DE | 1559569 A1 | * | 12/1970 | ............... E04B 1/86 |
| DE | 3909083 C1 | | 6/1990 | |
| DE | 3937756 A1 | * | 6/1990 | ........... E01F 8/0058 |
| DE | 102004006563 | | 9/2005 | |
| DE | 202009001754 | | 7/2010 | |
| EP | 2559532 | | 2/2013 | |
| GB | 709678 A | * | 6/1954 | ............... E04B 5/18 |
| JP | 03132540 A | * | 6/1991 | |
| WO | WO-9210440 | | 6/1992 | |
| WO | WO-2008026008 | | 3/2008 | |
| WO | WO-2012069024 | | 5/2012 | |
| WO | WO-2013148843 | | 10/2013 | |
| WO | WO-2013156852 | | 10/2013 | |

OTHER PUBLICATIONS

Shi, et al., Alkali-Activated Cements and Concretes, 2006, Chapter 11, pp. 277-297.

International Search Report, PCT/EP2014/072987, dated Jan. 20, 2015.

International Written Opinion, PCT/EP2014/072987, dated Jan. 20, 2015.

* cited by examiner

CONCRETE ELEMENT COMPRISING A SOUND-ABSORBER

CROSS REFERENCE TO RELATED APPLICATIONS

This application is a national stage application of International Application No. PCT/EP2014/072987, filed 27 Oct. 2014, which claims priority from European Patent Application No. 13191001.0, filed 31 Oct. 2013, which applications are incorporated herein by reference.

The present invention relates to a reinforced concrete element comprising a sound-absorbing, at least partially open-cell foamed material, which is partially exposed on a surface of the concrete element, wherein the reinforcement is partially enclosed by the foamed material. Furthermore, a method for producing such a concrete element and the use thereof as an acoustic ceiling in a building are disclosed.

The acoustic conditions in rooms are strongly dependent on the architectonic conditions. The variables which determine the acoustic impression of a room may be influenced more or less strongly by appropriate room design. In addition to simple noise reduction, the adaptation of the acoustic properties of a room to its intended purpose is an essential goal of room acoustics. In contrast to the outside world, the sound fields in rooms are diffuse, since they are generated from direct and reflected sound. The regulation thereof can be performed by a corresponding reduction of the sound power. Industrial sound absorbers are used for this purpose, which allow targeted absorption and reflection procedures.

Fundamentally, industrial absorbers, depending on the mode of operation thereof, may be classified into two groups, specifically into resonators and porous absorbers.

The principle of operation of resonators very generally relates to acoustic spring-mass systems, which have a pronounced sound absorption maximum. Examples of such sound absorbers are plate resonators, Helmholtz resonators, or micro-perforated absorbers.

In contrast thereto, the absorption of sound energy on porous absorbers primarily occurs by way of friction on the pore walls, where it is converted into thermal energy. An open-pored structure having sufficient porosity is necessary for this purpose. Because of the sound absorption primarily generated by dissipation, porous sound absorbers have a significantly different sound absorption spectrum in comparison to resonators. The frequency-dependent degree of sound absorption continuously rises in the ideal case toward higher frequencies in an S-shape and asymptotically approaches a maximum value. Porous absorbers can be constructed differently. The material variants are very diverse.

Foam products are generally two-phase systems, wherein one phase is gaseous and the other is solid or liquid. The gaseous phase consists of fine gas bubbles, which have either a spherical or tetrahedral shape and are delimited by solid or liquid cell webs. Therefore, they may be classified into two large groups, spherical foams and tetrahedral foams. The cell webs are connected to one another via node points and form a framework.

Foams having sound-absorbing properties are typically open-cell. The thin walls between the delimitation webs are destroyed here and the cells are connected to one another. The material thus acts as a porous absorber. The material characteristic of the cell webs in open-cell foams is very diverse. It extends from metals via inorganic materials up to organic polymers, which currently occupy the greatest proportion by far in industrial use and are designated in general as foams. Organic polymer foams are classified, depending on the hardness thereof, into soft foams and hard foams. The bubble formation typically occurs therein via a propellant gas, which arises in situ by way of a chemical reaction or by way of a chemical compound, which is dissolved in the organic matrix and boils or decomposes into gaseous products at low temperatures. In addition, foams may also be produced by mechanical admixing of gases, by polymerization in solution with phase separation, or by the use of fillers, which are dissolved out after the curing.

Open-cell PUR foams are described in many forms in the literature. They are conventionally produced from compounds containing isocyanates and polyols. Propellant gases are predominantly used for the foam formation, which are physically active by way of the low boiling point thereof. Targeted propellant gas combinations made of physically active propellant gases and carbon dioxide, which arises by chemical reaction of the isocyanate groups with water during the foaming, are also well known. During a reaction of water and isocyanates, in contrast to the reaction with polyols, urea groups arise in addition to carbon dioxide, which contribute to the formation of the cell framework.

DE 390908361 describes a plaster foam having porous structure and a method for the production thereof for sound and thermal insulation. A plaster-water suspension is mixed with an MDI prepolymer without further reaction partners in the presence of a wetting agent and foamed to form molded bodies.

Spacers, which are suitable for integration in a concrete structure, and consist of mineral materials, are known from DE 20 2009 001 754. In this case, this is a glass-based acoustically active foam which can be enveloped using a cement-based material, wherein one surface of the foam is not enveloped. These spacers are used as carriers for the reinforcement, in particular reinforcement rods. The spacers are arranged in this case such that the glass-based acoustically active foam is exposed after the pouring of the concrete and the removal of the formwork and therefore can act as sound absorbers. The concrete structure thus constructed has the disadvantage, however, that the structural height of the sound absorber cannot be selected freely and is limited by the reinforcement. To achieve sufficient sound absorption also for low frequencies, relatively thick layers are indicated in the case of porous absorbers. The spacers must therefore accordingly be dimensioned large, which results in thicker concrete structures. In addition to construction-technology problems, significantly more concrete is consumed in this way, wherein a non-optimum sound absorption must typically be accepted in practice.

For the reinforcement of concrete elements, reinforcement steel is suitable in particular, which is used as a ribbed or profiled round steel and has a high tensile strength. The required properties are regulated, for example, in DIN 488 (formerly DIN 1045-1) or in European Norm EN 10080. The reinforcement steel is produced in various forms. In Germany, the following embodiments are used in particular:

concrete rod steel B500B (according to DIN 488) (formerly "BSt 500 S(B)") as hot-rolled and ribbed rod steel having diameters of 6, 8, 10, 12, 14, 16, 20, 25, 28, 32, and 40 mm and delivery lengths up to 18 m rebar steel mats B500A and B500B (according to DIN 488) (formerly "BSt 500 M(A) and (B)") in various variants, as finished welded mats made of ribbed and profiled and also cold-formed rod steel (ductility class A) or hot-rolled rebar steel (ductility class B) having diameters from 6 mm to 14 mm (14 mm only in high-ductility embodiment, 6 to 12 mm in normal-ductility or high-ductility embodiment), grating supports as stiff reinforcement in particular in semifinished part ceilings and walls.

The modern rebar steels are characterized with respect to the deformation properties thereof by a modulus of elasticity of 200,000 to 210,000 N/mm$^2$ and the classification into ductility classes. In Germany, there is the normal-ductility class A for cold-formed steels having a ratio between tensile strength and yield point of at least 1.05 and a steel elongation under highest load of at least 2.5% and also the high-ductility class B for hot-formed steels having at least 1.08 or 5%, respectively. In addition, the high-ductility earthquake steel class C having a ratio between tensile strength and yield point of at least 1.15 and a steel elongation under highest load of at least 8% must be mentioned, which has a reduced yield point of 450 N/mm$^2$.

An important property of rebar steel is the bond thereof with the surrounding concrete. To improve the bond, ribs are rolled on. The ribs have a maximum height of 4.5% and a spacing of 60% of the rod diameter. Local interlocking between the concrete and the steel is achieved by the ribs, which allows optimum force transmission over a short bond length.

The object of the present invention is therefore to provide a reinforced concrete element having at least one integrated sound absorber, wherein the structural height of the sound absorber can be selected freely in broad limits, so that optimum sound absorption is achieved without having to vary the thickness of the concrete element.

This object is achieved by a reinforced concrete element comprising a sound-absorbing, at least partially open-cell foamed material, which is partially exposed on a surface of the concrete element, where the surface on which the foamed material is exposed consists only partially of the foamed material and where the reinforcement is partially enclosed by the foamed material.

Notwithstanding the fact that the stated object was completely achieved, the concrete element according to the invention has the advantage that it is producible simply and cost-effectively and allows rapid construction progress.

In one preferred embodiment, the concrete element is plate-shaped and is not completely permeated by the foamed material in the extension direction from one surface having the partially exposed foamed material to the opposing surface. Depending on the intended use, the plate-shaped concrete element according to the invention preferably has a total thickness of 5 to 50 cm, in particular 12 cm to 25 cm in this extension direction. The foamed material can preferably have a maximum thickness of 1 cm to 20 cm, in particular 3 cm to 10 cm, and particularly preferably 4 to 6 cm in the extension direction from the surface having the partially exposed foamed material to the opposing surface.

The reinforcement according to the invention can be in particular reinforcement steel. The employed thickness, shape, and quality of the reinforcement steel is dependent on the respective intended use of the concrete element. Welded or bonded rebar steel mats and grating supports are particularly suitable. Reinforcement steel which corresponds to the norm DIN 488 is preferably used.

The reinforcement is partially enclosed by the foamed material according to the invention. This is understood to mean that preferably between 5 and 60% by volume, particularly preferably 10 to 30% by volume of the reinforcement is enclosed by the foamed material.

In one preferred embodiment, the surface of the concrete element, on which the foamed material is exposed, consists 10 to 40% by area, in particular 15 to 25% by area, of the foamed material. It is particularly preferable in this case for the foamed material to be distributed at periodic intervals in the form of strips on the surface of the concrete element. In particular, these can be absorber strips, which have a width of 5 and 10 cm and are arranged at a period of 25 to 35 cm. It has been shown in this case that such an arrangement is particularly advantageous, since the admittance jumps between reverberant and sound-absorbing materials result in increased sound absorption.

The reinforced concrete element according to the invention can be a finished part, for example, which is subsequently used to build a building. In particular, it can be a ceiling, wall, or roof structure. The concrete element can particularly preferably be an acoustic ceiling, which is preferably produced on the construction site. Furthermore, however, it is also possible to use the reinforced concrete elements according to the invention as sound protection elements on streetcar and railway lines.

The material used as the foamed material can comprise in particular at least one foam from the series polyurethane foam, geopolymer foam, and melamine resin foam. The foamed material preferably has a density of 200 to 400 kg/m$^3$, particularly preferably 240 to 350 kg/m$^3$, and in particular at most 300 kg/m$^3$. The density is related in this case to the dry foamed material, wherein "dry" is understood as a residual moisture of less than 3% by weight. In particular, the foamed material can consist 20 to 90% by volume, in particular 50 to 60% by volume, of air. In one preferred embodiment, the exposed sound-absorbing foamed material is provided as an open-cell foamed material.

Acoustic foams known according to the prior art are suitable as polyurethane foams. An overview with respect to open-cell PUR foams is provided by G. Oertel, Polyurethanes, Becker Braun Kunststoffhandbuch [Plastics Handbook]7, Hanser Verlag Munich 1983.

The foamed material can particularly preferably comprise a geopolymer foam. In one special embodiment, the foamed material consists of a geopolymer foam.

Geopolymers are cement-like materials, which are formed by reacting at least two components. The first component is a reactive solid component, which contains $SiO_2$ and $Al_2O_3$, for example, flue ash or metakaolin. The second component is an alkali activator, for example, sodium water glass or sodium hydroxide. In the presence of water, due to the contact of the two components, hardening occurs by way of formation of an aluminosilicate, amorphous to partially crystalline network, which is water-resistant.

The process of hardening is performed in solutions having pH greater than 12 and differs from the hydration process of inorganic binders such as, for example, that of Portland cement. In this process, which predominantly occurs via the "solution", an incorporation of aluminum atoms and probably also the calcium and magnesium atoms into the original silicate lattice of the reactive solid components occurs. The properties of the products produced according to this method are particularly dependent on the concentration of the alkali activator and the moisture conditions.

Geopolymers were already studied in the 1950s by Glukhovsky. The interest of industry in these binders has increased significantly in the past years because of the interesting properties of these systems. Alkali-activated aluminosilicate binders permit strengths which can exceed those of standard Portland cements. Furthermore, these systems cure very rapidly and have a very high chemical resistance and temperature resistance.

An overview with respect to the substances coming into consideration as alkali-activatable aluminosilicate binders is provided by the citation Alkali-Activated Cements and Concretes, Caijun Shi, Pavel V. Krivenko, Della Roy, (2006), 30-63 and 277-297.

In a further preferred embodiment, the foamed material comprises an epoxy resin, in particular in the case of the geopolymer foam. In this way, the mechanical properties can be improved, in particular with regard to the cracking, bending tensile strength, and the haptics of the foamed material. The geopolymer foams according to the invention have the substantial advantage that they are not combustible and furthermore cannot release formaldehyde in comparison to some other foams, for example, melamine resin foams. The proportion of the epoxy resin, in relation to the dry geopolymer foam, can be in particular 0.5 to 10% by weight. In particular a proportion of 1 to 5% by weight has proven to be particularly advantageous with regard to the non-combustibility of the concrete element according to the invention.

In the scope of the present invention, the term "dry geopolymer foam" is understood as a foam having a residual moisture of less than 3% by weight.

A further object of the present invention is a method for producing a concrete element according to the invention, wherein the reinforcement and the sound-absorbing foamed material are introduced in the form of a reactive free-flowing mass into a formwork and the reactive free-flowing mass is at least partially cured.

The reactive free-flowing mass can already be introduced as a foam into the formwork in this case or can first form a foam after the introduction into the formwork. It is essential in this case that the reinforcement is partially enclosed by the foamed material before the addition of the concrete.

The formwork is preferably first prepared with the reinforcement and in a following step, the foamed material is introduced in the form of a reactive free-flowing mass, so that the reinforcement is partially enclosed by the foamed material. However, it is furthermore also possible firstly to introduce the foamed material in the form of a reactive free-flowing mass into the formwork and subsequently to insert the reinforcement. After the at least partial curing of the reactive free-flowing mass, concrete is introduced into the formwork and permitted to harden.

In one particularly preferred embodiment, the reactive free-flowing mass comprises an alkali-activated aluminosilicate binder, wherein the term alkali-activated aluminosilicate is to be understood to be synonymous with the term geopolymer in the scope of the present application.

As already stated, the foamed material can comprise a geopolymer foam and in a particularly preferred embodiment can consist of a geopolymer foam. The reactive free-flowing mass can comprise as a solid component, which contains $SiO_2$ and $Al_2O_3$, according to the invention in particular at least one aluminosilicate from the series of the natural aluminosilicates and/or synthetic aluminosilicates, in particular ground granulated blast furnace slag, microsilica, trass powder, oil shale, metakaolin, flue ash, in particular of type C and type F, blast furnace slag, aluminum-containing silica dust, puzzolane, basalt, clays, marl, andesite, diatomaceous earth, or zeolites, particularly preferably ground granulated blast furnace slag, flue ash, microsilica, slags, clay, and metakaolin. The reactive free-flowing mass according to the invention preferably contains these solid components in a quantity of 5 to 70% by weight, preferably 10 to 50% by weight, and in particular 15 to 30% by weight, wherein these can also be mixtures. For the curing reaction of the geopolymers, in particular the ratio of silicon atoms to aluminum atoms is of great significance. In the system according to the invention, a ratio of silicon atoms to aluminum atoms between 10 and 1.0 to 1.0 has proven to be advantageous, wherein a ratio between 6 and 1.5 to 1.0 and in particular between 1.8 and 2.2 to 1.0 and also between 4.7 and 5.3 to 1.0 is preferred.

In particular at least one compound from the series sodium water glass, potassium water glass, lithium water glass, ammonia water glass, sodium hydroxide, potassium hydroxide, sodium carbonate, potassium carbonate, alkali sulfates, sodium metasilicate, potassium metasilicate, preferably potassium water glass, sodium water glass, and potassium hydroxide is suitable as an alkali activator. In particular, potassium metasilicate solution having a solid content of 40-50% by weight and a weight ratio $SiO_2$:$K_2O$ of 0.6 to 0.8 or a molar ratio of 0.9 to 1.1 can also be used. Furthermore, potassium hydroxide having a concentration of 0.1-1 mol/l can preferably be used, a concentration of at least 0.9 mol/l is particularly preferred. According to the invention, the alkali activator is preferably contained in relation to the reactive free-flowing mass according to the invention in a quantity of 1 to 60% by weight, preferably 10 to 55% by weight, and in particular 25 to 50% by weight, wherein these can also be mixtures of these compounds.

Inter alia, rock flour, basalts, clays, feldspars, ground mica, ground glass, graphite powder, quartz sand or quartz powder, bauxite powder, aluminum hydroxide, and wastes of the aluminum oxide, bauxite, and corundum industry, ashes, slags, amorphous silica, pyrogenic silicic acid, microsilica, limestone, and mineral fiber materials come into consideration as the fillers. In particular grain sizes of up to 2 mm are suitable in this case. Light fillers such as perlite, diatomaceous earth, vermiculite, foam glass, and foam sand can also be used. Light fillers and in particular foam glass are preferably used. The foam glass particularly preferably has a mean grain size of 50-300 µm. According to the invention, the filler is contained in relation to the reactive free-flowing mass according to the invention preferably in a quantity of 5 to 50% by weight, preferably 10 to 35% by weight, wherein these can also be mixtures of these compounds.

For further improvement of the mechanical properties such as bending tensile strength and compressive strength, the reactive free-flowing mass according to the invention can comprise aluminosilicate in the form of micro-hollow beads having a preferred grain size of at most 100 µm. The proportion of micro-hollow beads in relation to the reactive free-flowing mass according to the invention is preferably at most 30% by weight, however, wherein a preferred ratio of micro-hollow beads to the remaining aluminosilicates is 0.8:1 to 1 to 0.8.

Furthermore, it is possible that the reactive free-flowing mass according to the invention comprises fibers, in particular in a proportion of up to 3% by weight. In this way, the mechanical stability of the foam can be improved. Polyvinyl alcohol fibers, polyacrylonitrile fibers, basalt fibers, and mixtures thereof are preferably used. In particular the fibers have a length of at most 120 mm, in particular at most 6 mm.

To improve the water-repellent effect of the foam, it can comprise a hydrophobic treatment agent. The proportion of the hydrophobic treatment agent can be in particular up to 3% by weight in relation to the reactive free-flowing mass according to the invention. Silicone oils or re-dispersible dispersion powders having hydrophobic property are preferably used. A silicone oil with a viscosity of 300 to 1000 mPa*s can preferably be used. A suitable commercially available product is, for example, silicone oil AK 500 from Wacker Chemie AG. Furthermore, for example, re-dispersible dispersion powder of the type Vinnapas having the designation 7031 H from Wacker Chemie AG can be used.

The solidification behavior and the setting time of the reactive free-flowing mass according to the invention can be positively influenced by the addition of calcium aluminate cement. The proportion of the calcium aluminate cement to the reactive free-flowing mass is preferably at least 3% by weight, preferably between 5 and 20% by weight. The setting time can furthermore be controlled by the addition of $Ca(OH)_2$. The proportion of $Ca(OH)_2$, in relation to the reactive free-flowing mass according to the invention, can be 1 to 15% by weight, in particular 3 to 10% by weight.

In one particularly preferred embodiment, the reactive free-flowing mass according to the invention comprises an air entraining agent and/or foam stabilizer. This can preferably be a surfactant. In particular, the surfactant can be at least one C8-C10 alkyl glucoside. A part of the surfactant, preferably less than 30% by weight, can be replaced by saponified balsam and tall oil rosin. For example, Vinapor MTZ/K50 from BASF SE can be used in this case, wherein this is powdered, spray-dried modified and saponified balsam and tall oil rosin.

The proportion of the surfactant, in relation to the reactive free-flowing mass according to the invention, can be in particular 0.1 to 2.5% by weight, in particular 0.5 to 1.5% by weight.

A particularly preferred embodiment of the method according to the invention provides that the reactive free-flowing mass according to the invention comprises a surfactant and is foamed by mechanical introduction of air. The foam is preferably to have an air content of 50-60% by volume for the acoustic effectiveness. In one special embodiment, the components of the reactive free-flowing mass according to the invention are mixed with the surfactant, wherein a commercially-available construction site mixer can be used, for example. A suspension having a density of 1000-1200 g/L is preferably formed in this case. This suspension can subsequently be foamed using air in a mixing head, which is constructed according to the stator-rotor operating principle. A suitable device for this purpose is, for example, the model Mügromix+ from Heitec Auerbach GmbH. The wet crude density of the foam is preferably 100 to 800 g/L, in particular 150 to 600 g/L.

In one further preferred embodiment, the reactive free-flowing mass comprises at least one water-emulsifiable epoxy compound and/or at least one self-emulsifying epoxy resin emulsion. In addition to the above-described advantages, the epoxy resin provides the geopolymer foam with earlier mechanical stability, so that the reinforced concrete element according to the invention can already be removed from the mold after 6 hours.

The epoxy compounds can comprise a resin and curing agent or a combination of resin, curing agent, and reactive diluent. The epoxy can preferably be a bisphenol A/F mixture and the curing agent can preferably be a poly-amino adduct. Preferably poly-glycide ethers of alkoxylated aliphatic alcohols are used as the reactive diluent.

In one preferred embodiment, an epoxy resin is mixed with a reactive diluent in the ratio of 60:40 to 40:60 parts by weight and furthermore 140 to 160 parts by weight curing agent are preferably added to this mixture.

In particular a self-dispersing epoxy resin emulsion can be used as an epoxy resin, which is preferably used in the stoichiometric ratio of 0.9 to 1.1 to 1 with a poly-amino amide adduct. For example, Waterpoxy 1422, Waterpoxy 1439, Waterpoxy 1466 come into consideration as commercially available self-dispersing epoxy resin emulsions, and Waterpoxy 751, Waterpoxy 760, Waterpoxy 801 come into consideration as curing agents. The use of a mixture of Waterpoxy 1422 and Waterpoxy 760 is preferred. The mentioned epoxy resin emulsions are products of BASF SE.

The method according to the invention provides that the geopolymer foam is preferably dried at temperatures of 20 to 30° C. and a relative ambient humidity of at least 65%. The removal of the formwork of the plate-shaped reinforced concrete element according to the invention can be performed after 24 to 48 hours.

The advantageous fire behavior is to be mentioned as a further advantage of the use of a foam based on geopolymers. Very good results were also achieved upon the use of organic additives, in particular also in the presence of epoxy resins. No smoke or dripping material arises during the flame impingement (DIN EN ISO 11925-2). The geopolymer foam according to the invention has in this case in particular a fire behavior according to DIN 13501-1 of A2 or A1.

Furthermore, it is also possible to provide the plate-shaped reinforced concrete element according to the invention with a covering, wherein it is to be ensured that in this way the sound-absorbing properties of the element are not substantially worsened. In particular woolen fleece, plaster, paint, and textiles having an open-pore, sound-open structure are suitable. The textiles can be provided with a printed motif in particular.

A further aspect of the present invention is the use of the concrete element according to the invention as an acoustic ceiling in a building.

In the drawings

The invention will be explained in greater detail hereafter with reference to the appended drawings.

EXAMPLES

Production of the Geopolymer Foam

TABLE 1

| | Trade name (producer) | mass [grams] | % by weight |
|---|---|---|---|
| Potassium hydroxide 1 mol/L | Emsure (Merck KGaA) | 50.04 | 16.41 |
| Potassium water glass | K45M (Simtek Corporation) | 87.50 | 28.69 |
| Surfactant | Glucopon DK225 (BASF SE) | 2.20 | 0.72 |
| Metakaolin | Metamax (BASF SE) | 71.10 | 23.32 |
| Foam glass | Fillite 106 (Omya GmbH) | 55.60 | 18.23 |
| Flue ash | Lühnen (STEAG Power Minerals GmbH) | 15.50 | 5.08 |

TABLE 1-continued

| | Trade name (producer) | mass [grams] | % by weight |
|---|---|---|---|
| Dispersion powder | Acronal S430 P (BASF SE) | 15.00 | 4.92 |
| PAN fibers | 6.7 dtex/6 mm (Trevira GmbH) | 8.00 | 2.62 |
| Total mass | | 304.94 | 100.00 |

The geopolymer foam is produced using a fully automatic foaming machine for continuous foaming of liquids and low viscosity pastes, which operates according to the stator-rotor principle (type Mügromix+ from Heitec Auerbach GmbH).

The components listed in Table 1 are mixed except for the surfactant in a construction site mixer (Zwangsmischer XM from Collomix Rühr- and Mischgeräte GmbH). A suspension having a density of 1000-1200 g/L results. Finally, the surfactant is added and mixed for a further 30 seconds. The suspension is pumped via a hose into the fully automatic foaming machine.

The processing parameters are as follows:
mixing head speed 300 rpm
system air pressure ~2 bar
material throughput 120 L per hour.

The produced foam has a density of 375 g/L and has an air content of 55% by volume. The air content is determined in this case via the change of the volume in relation to the unfoamed suspension based on DIN EN 1015-6. The foam has a dry crude density of 274 kg/m$^3$. The crude density of the produced foam is determined by the quotient of the mass thereof and the volume which the foam occupies.

Example 1

The ceiling element according to the invention is 1 m×1.5 m×0.12 m in size. A reinforcing net B500A (according to DIN 488) having a mesh width of 100 mm×100 mm, wherein the steel rods have a diameter of 6 mm, is firstly installed in a corresponding formwork. Subsequently, the geopolymer foam, which is obtained as described above, is sprayed onto the reinforcement in the form of strips and dried for 2 hours at 25° C. and 80% ambient humidity and subsequently concreted. For the production of the ceiling elements, an in-situ concrete of strength class C25/30 having a maximum grain size of 8 mm was selected. The fresh concrete has a density of 2328 kg/m$^3$ and has a consistency class of F5.

Figure 1:
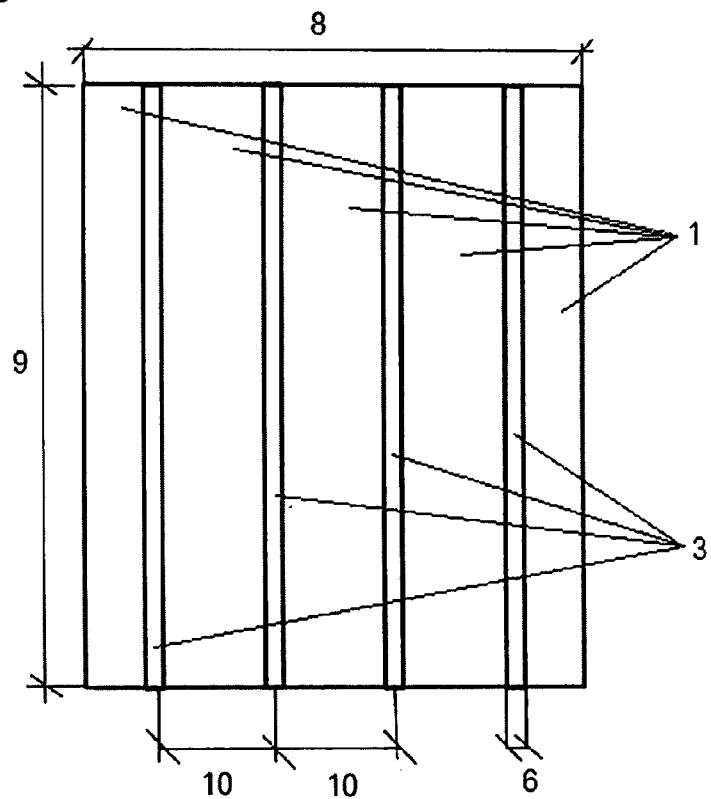
FIG. 1 shows a top view of a ceiling element according to the invention having periodically arranged absorber strips.

This ceiling element according to the invention is shown in FIG. 1. The ceiling element has a width of 100 cm (reference sign 8) and a length of 150 cm (reference sign 9). It has absorber strips made of geopolymer 3. The absorber strips made of geopolymer foam are arranged at a spacing of 25 cm (reference sign 10) on the surface. The absorber strips made of geopolymer foam have a width of 5 cm (reference sign 6). Furthermore, the surface is formed by strips made of concrete 1.

Figure 2:
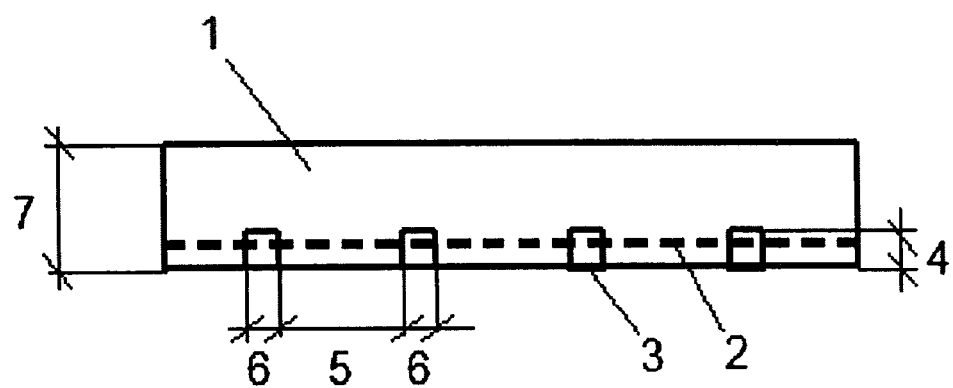
FIG. 2 shows a schematic cross-section of a ceiling element according to the invention having periodically arranged absorber strips, wherein the reinforcement is aligned parallel to the surface of the concrete element.

FIG. 2 shows this ceiling element according to the invention in cross-section. The ceiling element has a structural height of 12 cm (reference sign 7) and has absorber strips made of geopolymer foam 3. The absorber strips made of geopolymer foam have a width of 5 cm (reference sign 6) and a structural height of 5 cm (reference sign 4) and are arranged at a spacing of 20 cm (reference sign 5). Furthermore, the ceiling element consists of concrete 1. The reinforcement 2 is a construction steel mat B500A (according to DIN 488) having a mesh width of 100 mm×100 mm, wherein the steel rods have a diameter of 6 mm. The reinforcement is partially enclosed by the absorber strips made of geopolymer foam and is aligned parallel to the surface of the concrete element.

Example 2

Example 2 differs from example 1 in that a grating support is used as the reinforcement.

Figure 3:
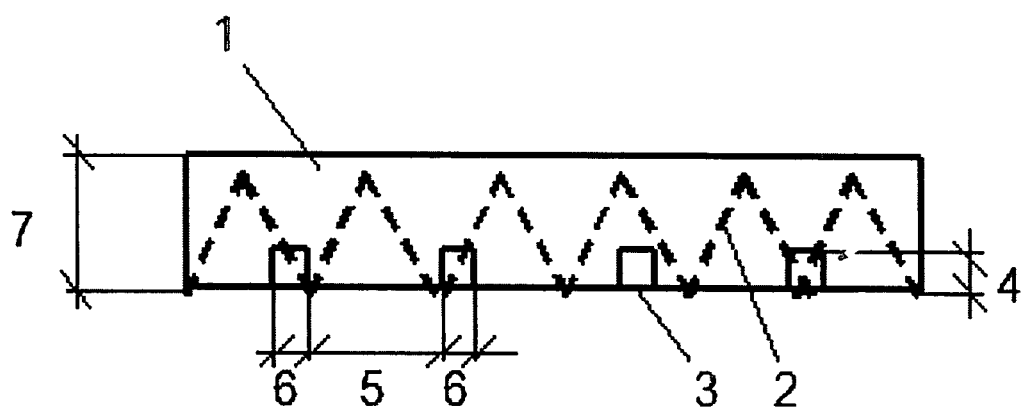
FIG. 3 shows a schematic cross-section of a ceiling element according to the invention having the periodically arranged absorber strips, wherein the reinforcement is a lattice support.

FIG. 3 shows this ceiling element according to the invention in cross-section. The ceiling element has a structural height of 12 cm (reference sign 7) and has absorber strips made of geopolymer foam 3. The absorber strips made of geopolymer foam have a width of 5 cm (reference sign 6) and a structural height of 5 cm (reference sign 4) and are arranged at a spacing of 20 cm (reference sign 5). Furthermore, the ceiling element consists of concrete 1. The reinforcement is a lattice support having the designation Filligran-E-Gitterträger from Filigran Trägersysteme GmbH & Co. The lattice support consists of rebar steel B500A (according to DIN 488), wherein the steel rods have a diameter of 6 mm. The reinforcement is partially enclosed by the absorber strips made of geopolymer foam.

The invention claimed is:

1. A reinforced concrete element comprising a sound-absorbing, at least partially open-cell foamed material, which is partially exposed on a surface of the concrete element, where the surface on which the foamed material is exposed consists only partially of the foamed material, wherein a reinforcement is partially enclosed by the foamed material.

2. The concrete element according to claim 1, wherein the concrete element is plate-shaped and is not completely permeated by the foamed material in an extension direction from the surface having the partially exposed foamed material to the opposing surface.

3. The concrete element according to claim 1, wherein the surface on which the foamed material is exposed consists of 10 to 40% by area of the foamed material.

4. The concrete element according to claim 1, wherein the foamed material is distributed at periodic intervals in the form of strips on the surface.

5. The concrete element according to claim 1, wherein the foamed material comprises a geopolymer foam.

6. The concrete element according to claim 1, wherein the foamed material has a density of 200 to 400 kg/m$^3$.

7. The concrete element according to claim 1, wherein the foamed material comprises an epoxy resin.

8. The concrete element according to claim 1, wherein the foamed material consists of 20 to 90% by volume of air.

9. The concrete element according to claim 1, wherein the element is a ceiling, wall, or roof structure.

10. A method for producing the concrete element according to claim 1, wherein the reinforcement and the sound-absorbing foamed material are introduced in the form of a reactive free-flowing mass into a formwork and the reactive free-flowing mass is at least partially cured.

11. The method for producing a concrete element according to claim 10, wherein the reactive free-flowing mass comprises an alkali-activated aluminosilicate binder.

12. The method for producing a concrete element according to claim 10, wherein the reactive free-flowing mass comprises a surfactant and is foamed by mechanical introduction of air.

13. The method for producing a concrete element according to claim 10, wherein the reactive free-flowing mass comprises at least one water-emulsifiable epoxy compound and/or at least one self-emulsifying epoxy resin emulsion.

14. The method for producing a concrete element according to claim 10, wherein the reactive free-flowing mass comprises fibers.

15. A method comprising installing the concrete element according to claim 1 as an acoustic ceiling in a building.

* * * * *